(No Model.)

J. T. CARMODY.
PULLEY.

No. 441,825. Patented Dec. 2, 1890.

Attest.
S. W. Brainerd.
O. T. Brainerd.

Inventor
John T. Carmody
By J. M. St. John
Atty.

UNITED STATES PATENT OFFICE.

JOHN T. CARMODY, OF CEDAR RAPIDS, IOWA, ASSIGNOR OF ONE FOURTH TO D. C. H. ROSS, OF SAME PLACE.

PULLEY.

SPECIFICATION forming part of Letters Patent No. 441,825, dated December 2, 1890.

Application filed April 11, 1890. Serial No. 347,430. (No model.)

*To all whom it may concern:*

Be it known that I, JOHN T. CARMODY, a citizen of the United States, residing at Cedar Rapids, in the county of Linn and State of Iowa, have invented certain new and useful Improvements in Pulleys; and I do hereby declare the following to be a full, clear, and exact description of the invention, such as will enable others skilled in the art to which it appertains to make and use the same.

The object of my invention is to produce a pulley which is readily adaptable for use as a tight or loose pulley and is easily and quickly attached to its shaft, and to improve the construction of the pulley so that the same may be readily reduced in diameter or applied to shafts of varying sizes.

The invention consists in the construction, combination, and arrangement of parts, as hereinafter fully set forth and claimed.

Figure 1:
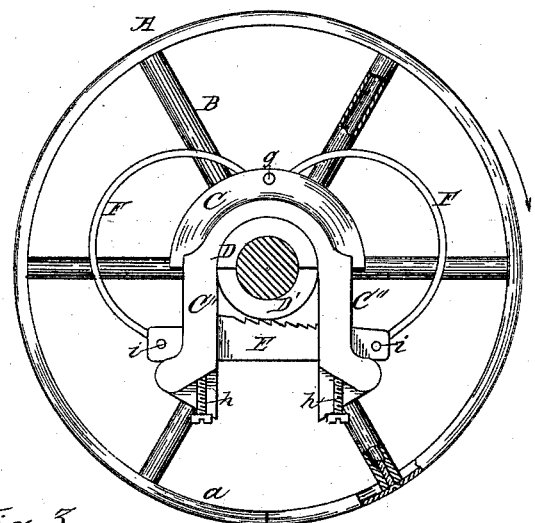
Figure 3:
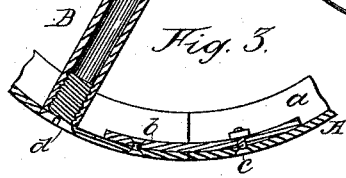
Figure 4:
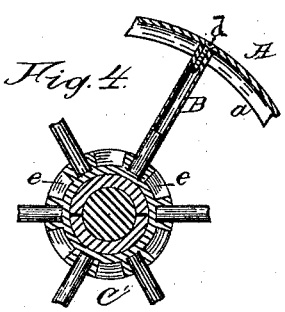
Figure 2:
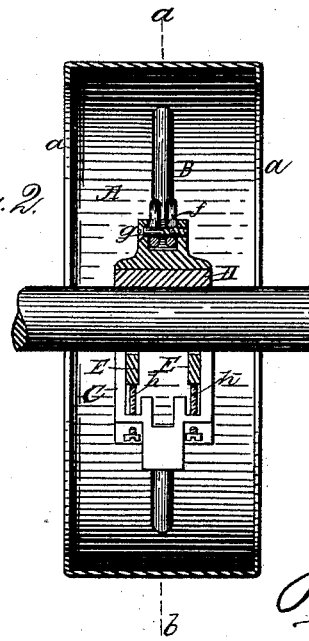

In the accompanying drawings, forming a part of this specification, Figure 1 is a side elevation of a pulley embodying my invention. Fig. 2 is a central transverse section of the same. Fig. 3 is a fragmentary sectional view showing the manner of joining the rim, and Fig. 4 is a sectional fragmentary view on the line $a\ b$, showing a modified form of hub.

Similar letters of reference indicate corresponding parts.

Referring to the drawings, A is the rim of the pulley, B the spokes, and C the hub. Certain improvements in the detail of construction are also shown in connection with a hub C', made continuous, as shown in Fig. 4, as will be hereinafter more fully explained.

In the construction of the pulley a separable rim of thin material, as sheet-steel, is used, and for the proper protection of belts, as well as to increase the stability of the pulley, a flange $a$ is turned inwardly on each side of the rim. At the meeting place one end of the rim is provided with a leaf $b$, permanently secured to it by suitable rivets or otherwise. To the projecting portion of this leaf the other end of the rim is secured by bolts $c$, having suitable countersunk heads. By this arrangement the rim may be opened to allow the pulley to be put on a fixed shaft, and as the rim is flexible the size of the pulley may be reduced by simply cutting off one end, drilling new holes for the bolts, and compressing the rim.

The spokes are made tubular, so as to combine lightness and strength, and also to admit of an internal thread being made in the outer end for the screw $d$, which connects the rim to the spoke. The coring of the hub at $e$ also tends to reduce the weight of the pulley to the minimum without materially diminishing its strength. This construction admits of a change being quickly made in the diameter of the pulley and at a trifling expense. It is only necessary to saw off the ends of the spokes, tap them out, cut off the end of the rim, and bore new holes for the bolts and for the screws that connect the rim with the spokes, when the parts may be put together as a smaller pulley. The effect is a material saving in the expense of manufacture, since different patterns for all sizes of pulleys are unnecessary. The manufacturer simply makes his spiders with any desired length of spoke and cuts them to the size of any pulley that may be ordered, and the rim in the same manner.

In Figs. 1 and 2 is shown a pulley that is at once adapted for use as a tight or loose pulley. In this the hub is made with one side open. The opposite side forms a seat for a half box or bush D, the internal diameter of which may be varied at pleasure to suit any size of shaft. When in use as a loose pulley, two of these are used, as shown in Fig. 1. Within the arms C'' C'' of the hub are mounted wedges E E, having a serrated edge impinging upon the bush D'. These wedges are held in normal position by springs F, which tend to draw the wedges toward the center of the shaft. The springs are seated in a recess $f$ in the hub and held in place by a screw or pin $g$, passing over a loop in the springs. Screws $h\ h$ in the arms C'' C'' serve for adjustment of the wedges. To the outer ends of the arms C'' C'' two short spokes are attached.

The operation of the pulley will now be understood. The pulley being revolved in the direction indicated by the arrow through the combined action of the springs and serrated wedges, the tendency is to press the halves of the bushing together and hold both tightly in the hub when in use as a loose pulley. The bore of the bush is of course large enough to allow the pulley to revolve on the shaft. To remove the pulley from the shaft the angled ends of the springs F F are slipped out of the holes *i i* in the ends of the wedges and the wedges removed. Then by opening up the side of the pulley, as before explained, the same may be readily taken off the shaft.

To make a tight pulley it is but necessary to remove the bush D' and turn up the screws *h h* for a bearing to the lower edge of the wedges. The tension of the springs tends to press the wedges into engagement with the shaft, and as the pulley is turned in the direction indicated by the arrow it is drawn tightly upon the shaft. The other bush D serves to center the pulley.

Having thus described my invention, what I claim as new, and desire to secure by Letters Patent, is—

1. In a pulley, the combination of a hub having an elongated seat for bushing-boxes, serrated wedges mounted in said hub, arms transversely to said bushing-boxes and adapted to engage with one of them or with the shaft, springs adapted to press said wedges into engagement with the shaft or the bush, and means, substantially as described, for adjusting the bearing of the outer edges of the wedges, whereby the drawing of the pulley in one direction tends to tighten the wedges upon the bushing or shaft, substantially as set forth.

2. In a pulley, the combination of a hub open on one side, tubular spokes connected with said hub, separable rim of thin material, means for uniting the separable portions of the rim, screws passing through the rim and into the spoke ends, and means for securing the hub to the shaft.

3. In a pulley, the combination, with a detachable flexible rim open at one side, of a hub open at one side, spokes connecting the hub with the rim, wedges mounted transversely to the bore of the hub and having a serrated inner edge adapted to engage with the shaft, and springs removably connected with said wedges, whereby the wedges may be detached and the pulley removed by opening the rim, as set forth.

In testimony whereof I affix my signature in presence of two witnesses.

JOHN T. CARMODY.

Witnesses:
S. W. BRAINERD,
J. T. BRAINERD.